United States Patent [19]
Hill

[11] 3,866,859
[45] Feb. 18, 1975

[54] METHOD AND APPARATUS FOR DEFINING AN EQUIPOTENTIAL PLANE IN THE ELECTROSTATIC FIELD IN THE ATMOSPHERE UTILIZING ROTATING POTENTIAL SENSING PROBES

[76] Inventor: Maynard L. Hill, Silver Spring, Md.
[22] Filed: Nov. 16, 1973
[21] Appl. No.: 416,661

[52] U.S. Cl............. 244/77 R, 244/17.13, 324/32, 324/72, 318/584, 318/585, 340/27 AT
[51] Int. Cl............................................ B64c 13/18
[58] Field of Search............ 244/17.11, 17.13, 77 R, 244/77 D, 77 E; 324/32, 72; 340/27 AT; 343/100 AD, 100 AP, 106 R, 106 D, 701, 705, 763; 416/18, 61; 318/584, 585

[56] References Cited
UNITED STATES PATENTS

| | | | |
|---|---|---|---|
| 1,919,215 | 7/1933 | Gunn | 324/72 |
| 2,454,630 | 11/1948 | Buckthal | 324/72 |
| 2,702,169 | 2/1955 | Cannon et al. | 244/17.11 |
| 2,913,700 | 11/1959 | Brody | 244/17.11 X |
| 3,719,337 | 3/1973 | Gardner | 244/77 D |

Primary Examiner—Trygve M. Blix
Assistant Examiner—Stephen G. Kunin
Attorney, Agent, or Firm—Kenneth E. Darnell, Robert E. Archibald

[57] ABSTRACT

A method and apparatus for defining an equipotential plane in the static electric field existing in the earth's atmosphere, the invention utilizes the static electric field as a reference for generating an information-bearing electrical signal. Electrostatic sensing probes placed on a blade or rod member rotating in a plane either effectively parallel to or perpendicular to a given axis of an airborne vehicle allows detection of the attitude of said axis relative to an equipotential plane existing in the atmosphere, which equipotential plane may be typically used as a reference to stabilize the airborne vehicle relative to the earth's surface. The plane in which the sensing probes rotate is referenced to the horizontal equipotential planes existing in a gradient fashion in the atmosphere, rotation of the probes in a plane parallel to the earth's surface (thus usually parallel to the aforesaid equipotential planes) producing a zero output from a differential voltmeter or ammeter connected to the probes. If the plane in which the probes are rotating pitches downwardly, upwardly, or banks, a signal is produced having an amplitude proportional to the angular attitude of the said plane relative to a reference plane, e.g., an equipotential plane in the atmosphere, and a phase related to the azimuthal direction of maximum tilt thereof. The signal thus generated can be used to alter the orientation of the plane in which the probes are rotating to produce a desired stabilization of an airborne vehicle.

12 Claims, 9 Drawing Figures

LEVEL FLIGHT

PITCH DOWN

PITCH UP

RIGHT BANK

LEFT BANK 3,866,859

METHOD AND APPARATUS FOR DEFINING AN EQUIPOTENTIAL PLANE IN THE ELECTROSTATIC FIELD IN THE ATMOSPHERE UTILIZING ROTATING POTENTIAL SENSING PROBES

STATEMENT OF GOVERNMENT INTEREST

The invention herein described was made in the course of or under a contract with the Department of the Navy.

BACKGROUND AND SUMMARY OF THE INVENTION

The existence of a static electric field in the earth's atmosphere has long been known. This static electric field has been determined to exhibit a vertical potential gradient, the change in potential decreasing with increasing altitude. At any altitude, however, lines joining points of equal potential or planes including equipotential points are essentially horizontal, especially in a localized area. Detection of and definition of equipotential lines and planes has been shown to be useful as a reference for aircraft stabilization inter alia by me in U.S. patent application, Ser. No. 301,363, filed Oct. 27, 1972. The present invention provides method and means for defining an equipotential plane in the electrostatic field existing in the atmosphere, the plane thus defined being used as a reference for generating an information-bearing electrical signal. According to the present invention, voltage sensing means are rotated in the electrostatic field to generate an AC signal, the signal being generated by a differential voltmeter or ammeter. Given the disposition of the plane of rotation of said means relative to the earth's surface and relative to an airborne vehicle or other object on which said means are disposed, a signal is generated which is related to the alignment of the pitch and roll axes of the airborne vehicle with respect to equipotential planes existing in the atmospheric electrostatic field. The present invention allows use of low impedance circuitry which is less susceptible to leakage current perturbations, bias currents, charge on the airborne vehicle, etc., which are commonly encountered with DC circuitry.

A particular application of the present invention is for stabilization of a helicopter or other airborne vehicle having rotating blades thereon. Electrostatic sensing probes placed on the rotor blades of the vehicle provide a measure of the alignment of the plane in which the blades rotate with the horizontal equipotential planes existing in the earth's atmosphere. Rotation of the blades within an equipotential plane, which equipotential plane is usually parallel to the earth's surface, produces a zero output from a differential voltmeter electrically joined to the sensing probes. If the plane in which the rotor blades are turning pitches downwardly, upwardly, or banks an AC signal is produced having an amplitude proportional to the angle of the rotor blade motion, i.e., to the attitude of the plane of the blades, and a phase related to the azimuthal direction of the tilt angle thereof. The signal thus generated can then be used to alter the orientation of the rotor blade plane to stabilize the vehicle.

The invention may also be embodied in apparatus comprised of a rotating dipole antenna on an aircraft, rotation of the antenna causing an AC signal to be generated by a differential voltmeter or ammeter. Pitch, roll, or a combination thereof is sensed by a given alignment of the plane of rotation of the antenna. For sensing simple roll, the plane of rotation of the antenna would be perpendicular to the longitudinal axis of the fuselage. For sensing simple pitch, the plane of rotation of the antenna would be perpendicular to the transverse axis of the aircraft. A combination signal related to both pitch and roll is produced if the plane of rotation of the antenna is essentially horizontal to the aircraft in the manner of the plane of helicopter rotor blades. For the simple roll and pitch situations, respective reference signals are generated to indicate the time at which the dipoles of the antenna are vertical with respect to the longitudinal and transverse axes of the aircraft. Roll or pitch is then indicated by a pair of AC signals having phases which shift with respect to the reference signal. Either a single rotating antenna mounted on a rotating base or two separate rotating antenna could also be used to provide both pitch and roll information.

It is therefore an object of the invention to provide a method and apparatus for continuously defining and equipotential line or plane in the earth's static electric field.

It is another object of the invention to provide apparatus for detecting the attitude of an airborne vehicle relative to an equipotential line or plane in the earth's static electric field.

Further objects and advantages of the invention will become more readily apparent in light of the following detailed description of the preferred embodiments of the ivention.

DESCRIPTION OF THE PREFERRED EMBODIMENTS

The invention generally comprises a method and means for defining an equipotential line or plane in the static electric field existing in the earth's atmosphere by rotation of potential sensing means in said electric field to produce an AC signal, the signal being related to the alignment of the plane of rotation of said sensing means with an equipotential plane in the atmosphere. The invention may be used in a first embodiment for stabilization of a rotary-winged aircraft, such as a helicopter. In U.S patent application, Ser. No. 301,363, filed Oct. 27, 1972, I describe a method and means for stabilizing an aircraft using a defined equipotential line or plane in the atmosphere as a reference. While my invention may be used to stabilize a helicopter, such use is difficult, particularly for non-rigid rotor configurations, i.e., configurations having pivoted or swiveled rotors on the vertical shaft and where the rotors are allowed some freedom of angularity between the fuselage axes and their planes of rotation. When voltage sensing probes are disposed on the fuselage of a helicopter to sense fuselage attitude according to my aforesaid method, the resulting voltage difference signals must be conditioned to cause the rotors of the helicopter to generate stabilizing corrective forces. The signals must be shifted in phase with respect to fuselage attitude and accelerations. While this is possible, the present invention allows stabilization of the rotors themselves in either non-rigid or rigid rotor systems to orient the plane of the rotors in a plane parallel to a horizontal equipotential plane or at a desired angle thereto. Thus, the invention allows implementation of a system for automatic hovering or controlled forward and/or sideways cruising which is low in cost due to the ability thereof to apply simple roll and pitch corrections directly to the rotors.

Figure 1:
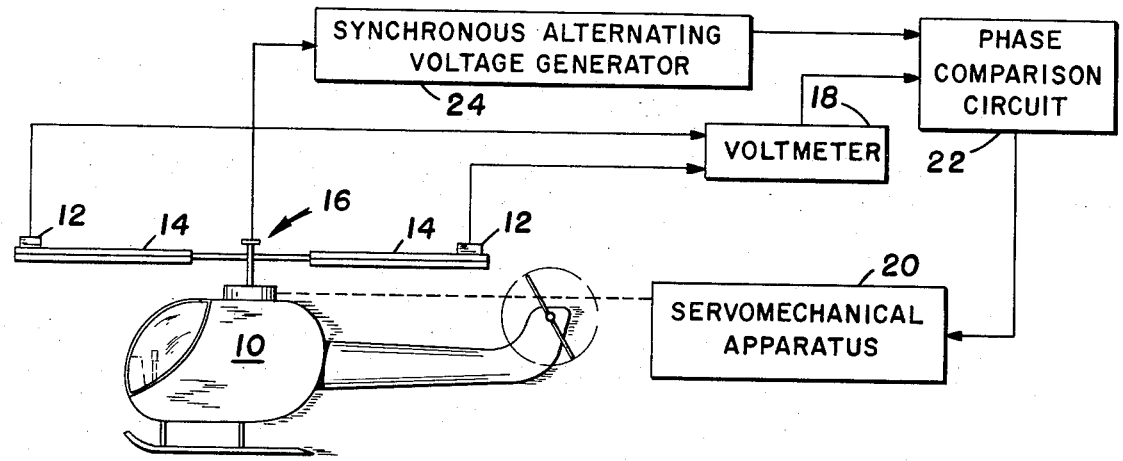
FIG. 1 is a schematic view of a stabilization apparatus according to the invention mounted on a helicopter.

As seen in FIG. 1, a helicopter 10 has voltage sensing probes 12 disposed on the ends of each blade 14 of a two-bladed pivoted rotor mechanism 16. The probes 12 may be of the type described in my aforementioned patent application or may be flat conductive plates or conductive wires. The blades 14 of the rotor mechanism 16 exhibit cyclic pitch, i.e., the angle of attack of the blades change as a function of rotation. In a system of this type, the blades 14 must be non-conductive or insulated at the center of the rotor mechanism 16. Alternatively, the probes 12 may be insulated and provided with well-known insulated conductive connections (not shown) leading to a differential voltmeter 18. The voltage sensed by the probes 12 may be transmitted through well-known slip rings (not shown) on the shaft of the rotor mechanism 16. The differential voltmeter 18, which may be of the type described in my aforementioned patent application, compares the voltage sensed at each probe 12 to produce an output signal which is the difference between the sensed voltages. The output from the voltmeter 18 is transmitted to a phase comparison circuit 22 which compares the voltmeter output with a reference signal produced by a synchronous alternating voltage generator 24. The generator 24 produces a signal in response to the position of the rotor blades 14, a zero position being conveniently taken as that position of the blades 14 which align with the longitudinal axis of the helicoper 10. The generator signal can conveniently take the form of a sine waveform. The comparison circuit 22 compares the reference sine waveform from the generator 24 with the sine waveform produced by the voltmeter 18. An output based on this comparison is fed to servomechanical apparatus 20 which automatically stabilizes the helicopter 10 in a known fashion or to a readout device or meter (not shown) which enables the pilot to manually adjust the attitude of the helicopter as desired. The generator 24 and comparison circuit 22 are well-known systems previously employed in other related and unrelated areas of technology. If the plane in which the blades 14 rotate (or the plane in which the probes 12 lie) lies within an equipotential plane (which is usually horizontal to the earth's surface) a zero output from the differential voltmeter 18 is obtained. However, if the plane of the rotor blades 14 pitches downwardly, upwardly, or banks, an alternating signal is generated by the voltmeter, the signal having an amplitude proportional to the angle of the motion of the plane of the rotor blades, i.e., the attitude thereof, and having a phase related to the direction of motion of said plane.

As can be seen in FIGS. 2a through 2e, different inclinations of the plane of the rotor blade 14 having the probes 12 thereon cause different output voltage signals to be generated by the voltmeter 18. It should be emphasized once again that the plane of the rotor blades 14 is inclined relative to equipotential planes existing in the static electric field of the earth's atmosphere, which planes are typically horizontal with respect to the earth's surface. Thus, the location of an equipotential plane is essentially defined by practice of the present invention and can be additionally used as a reference to stabilize an airborne vehicle, such as a helicopter, or to detect the attitude of such vehicle with respect to said equipotential plane.

Figure 2A:
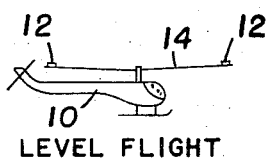
FIG. 2 is a schematic view of a helicopter illustrating the effects on the output voltage of a voltmeter comprising the invention at typical inclinations of the helicopter to an equipotential plane.
Figure 2A:
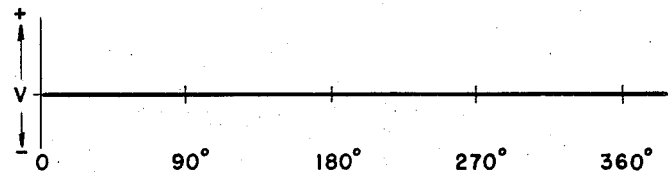

In FIG. 2a, the output signal of the voltmeter 18 is seen to be zero during "level flight" of the helicopter 10, level flight being that situation in which the plane of rotation of the blades 14 is parallel to (and thus effectively coincident with) a localized equipotential plane in the atmosphere. Since the helicopter itself is fixed in position relative to the plane of rotation of the blades 14 and since the localized equipotential plane is essentially horizontal with the earth's surface the helicopter is shown to be flying "level" with respect to the earth's surface by the zero output of the voltmeter 18 (shown in FIG. 1). These distinctions hold for every flight situation of the helicopter 10 but will not be dealt with in detail each time a flight attitude of the helicopter is described.

Figure 2B:
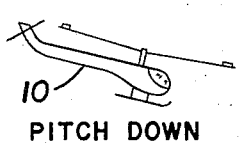
Figure 2B:
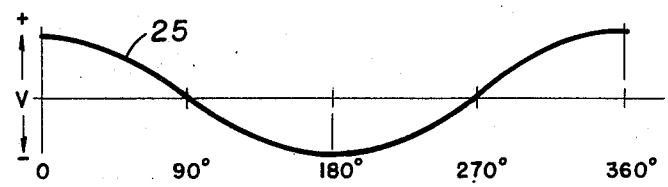
Figure 2C:
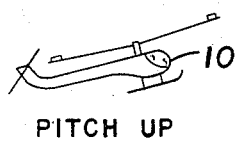
Figure 2C:
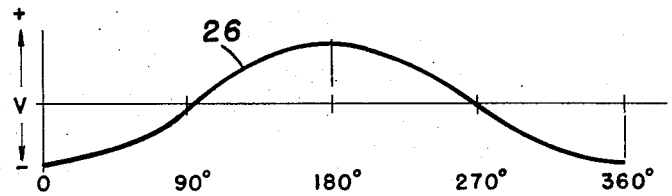
Figure 2D:
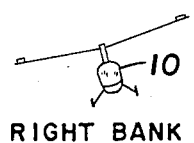
Figure 2D:
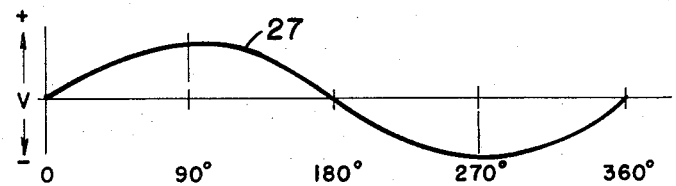
Figure 2E:
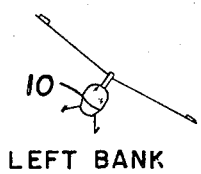
Figure 2E:
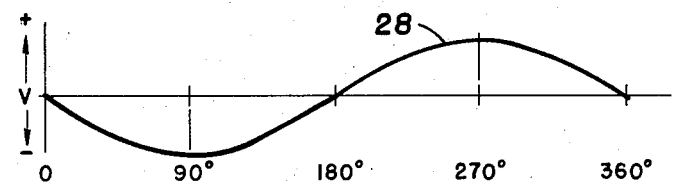

A "pitch down" of the plane of rotation of the blades 14 produces a single cycle sine wave 25 for each 360° of rotation of the rotor mechanism 16 as shown in FIG. 2b. The positive peak of the sine wave 25 occurs at the zero degree reference with respect to the rotational azimuthal angle of the plane of the blades 14. For the "pitch up" motion shown in FIG. 2c, a single cycle sine wave 26 is generated having a positive peak at 180°. A "right bank" motion of the plane of the blades 14 (thus the helicopter 10 itself) produces a sine wave 27 having a positive peak at 90°, as seen in FIG. 2d, and a "left bank" motion produces a sine wave 28 having a peak at 270°, as seen in FIG. 2e.

The information obtained from the signals represented by the sine waves 25, 26, 27, and 28 as well as the zero output of FIG. 2a, can be used to control the servomechanical apparartus 20 of FIG. 1 to stabilize the rotor either in a horizontal fashion or at a desired fixed angle to horizontal. These sine waves are compared with the sine waveform generated by the generator 24 of FIG. 1 as described relative to FIG. 1 to determine the rotational angle at which the peak positive value of the signal occurs. If the peak positive value of the signal occurs at zero degrees, for example, a correcting command would be sent from the comparison circuit 22 of FIG. 1 to the apparatus 20 to produce an upward pitching moment to the plane of blade rotation. If the peak positive value of the signal occurs at 90° as in FIG. 2d, then corrections for a pure banking moment can be made, these corrections being servomechanically accomplished in a well-known fashion. Occurrence of the peak positive value of the signal from the voltmeter 18 at any locus throughout the complete 360° rotation can be resolved into roll and pitch components and the necessary corrections made by splitting the inputs in a proper ratio to provide both pitch and roll (of the plane of rotation of the blades 14) corrections in a well-known fashion.

Alternately, the output of the voltmeter 18 can be read by means of a commutator when at any given angle, for example ±10°, of the longitudinal axis of the helicopter, the information thus obtained being used to generate a corrective pitch moment. Roll correction can be generated similarly by use of a commutator operable at any given angle of the rotor blades 14 to the transverse axis of the helicopter. Both of the systems thus described for use of the signal generated by the invention requires a determination of the rotational, or azimuth, angle of the rotor mechanism 16, a function accomplished in a well-known fashion by the generator 24 at the shaft of the rotor mechanism.

Figure 3:
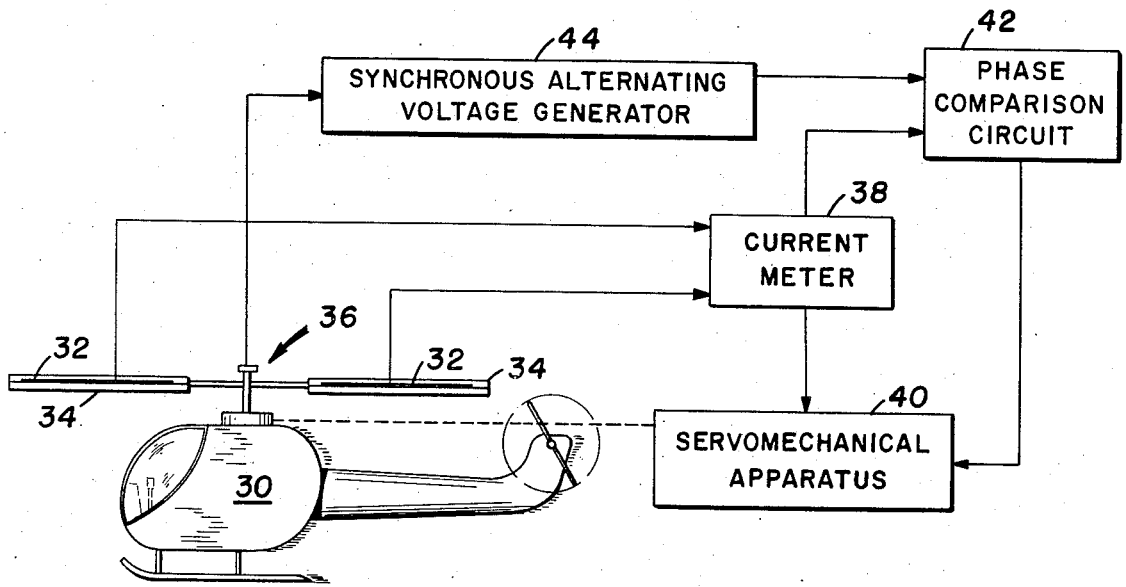
FIG. 3 is a schematic view of a stabilization apparatus according to the invention and which utilizes a current meter to detect the attitude of a helicopter.

The invention could also be practiced through use of a low impedance current meter rather than the very high impedance voltmeter required for use as the voltmeter 18. The use of a current meter would prove more reliable in rain, snow, salt spray, and with electrically conductive rotor blades. FIG. 3 illustrates a helicopter 30 having sensing probes 32 disposed on the rotor blades 34 of rotor mechanism 36. The probes 32 are simple conductive wires. A current meter 38, such as of the type described in my aforementioned patent application, is electrically joined to the probes 32 and generates a single cycle sine wave with each full 360° rotation of the rotor mechanism 36 whenever the rotation is out of the equipotential plane. Since the current meter 38 detects a rate of change of inclination of the probes 32 (or rotor blades 34) as they rotate, the output of said meter 38 is the derivative of the sine waves 25, 26, 27, and 28 of the several motions of a helicopter shown in FIGS. 2b through 2e. That is, the positive peaks of the sine wave will be retarded 90° behind the rotational positions shown in FIGS. 2b and 2e. Level flight of the helicopter 30 produces a zero signal. The amplitudes of the signals produced by the current meter 38 are proportional to the angle of inclination between the plane in which the blades 34 rotate and the local electrostatic equipotential plane. The output of the current meter 38 may be applied to a phase comparison circuit 42 which compares said output with a reference signal related to the position of the rotor blades 34 and provided by a generator 44. The circuit 42 and generator 44 function in the manner of the circuit 22 and generator 24 of FIG. 1. The output of the circuit 22 is applied to a servomechanical apparatus 40 to cause automatic stabilization of the helicopter 30.

The effects of the variable vertical potential gradient can be compensated for by gain control means such as that described by me in my aforementioned patent application. The gain control apparatus shown by me can used with the voltmeter system of FIG. 1 or with the current meter system of FIG. 3.

Figure 4:
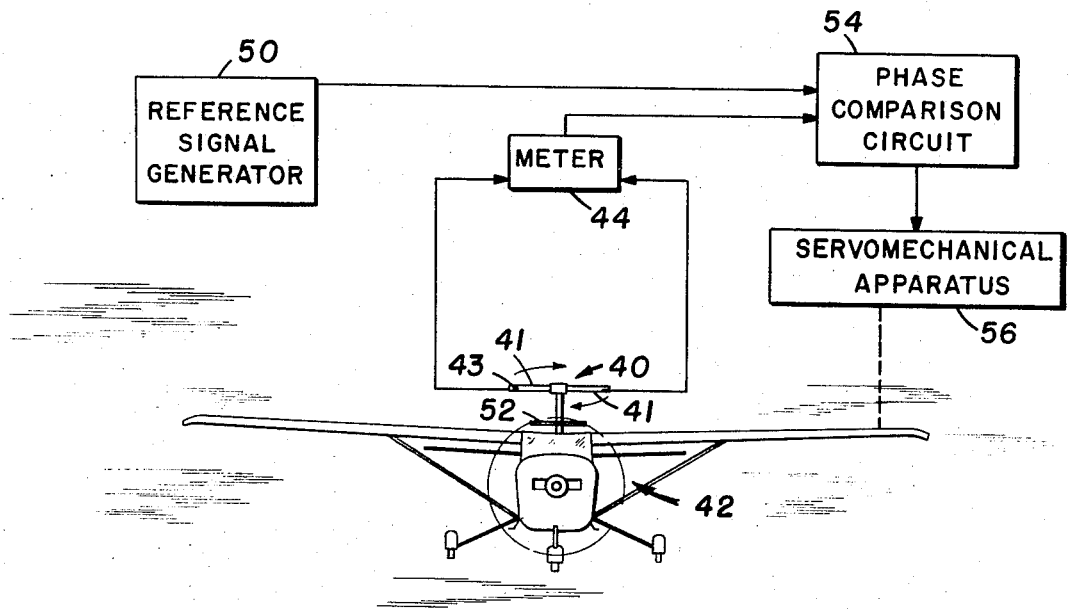
FIG. 4 is a schematic view of a rotating dipole antenna configured according to the invention and mounted on an aircraft; and, FIG. 5 is a detailed schematic view of a rotating dipole antenna.

A further embodiment of the invention may be used for stabilization of any aircraft. This embodiment, shown in FIGS. 4 and 5, comprises a rotating "dipole" antenna 40 positioned on an aircraft 42. Rotation of the antenna 40 causes an AC signal to be generated by a meter 44 which may be a differential voltmeter. Taking the plane of rotation of the antenna 40 to be perpendicular to the longitudinal axis of the aircraft 42, roll orientation of the aircraft may be detected. Pitch orientation of the aircraft is detected by disposing the plane of rotation of the antenna 40 perpendicular to the transverse axis of the aircraft. Disposition of the plane of rotation of the antenna in a horizontal fashion parallel to the axes of the aircraft produces a signal which indicates misalignment of the axes of the aircraft with an equipotential plane in the atmosphere and produces an AC signal from the meter 44 which has an amplitude proportional to the misalignment as described previously relative to the plane of rotation of the blades 14 in FIGS. 1 and 2, stabilization of the aircraft 42 being accomplished in the manner already described relative to FIGS. 1 and 3.

A current meter can be used replaceably with the voltmeter 44 to generate a signal as previously described. A reference signal must be generated with either a voltmeter or current meter such as by a well-known reference signal generator 50, to indicate the time at which the dipoles of the antennae are vertical with respect to the longitudinal and transverse axes respectively of the aircraft 42. Pitch and roll attitudes of the aircraft 42 is then indicated by a pair of AC signals having phases which shift with respect to the reference signal. A pair of rotating antennae such as 40 can be used to stabilize or detect the attitude of the aircraft 42 in both pitch and roll, or a single antenna mounted on a rotating base 52 could be used. An antenna 40 rotating in a plane perpendicular to the longitudinal axis of the aircraft 42 provides roll information while an antenna 40 rotating in a plane perpendicular to the transverse axis of aircraft 42 provides pitch information. The antenna 40 of FIG. 4, through the meter 44, provides a roll-related signal which is compared by a well-known phase comparison circuit 54 with a reference signal generated by the generator 50. The output of the circuit 54 is applied to a servomechanical apparatus 56 which operates stabilizing surfaces on the aircraft 42 to cause said aircraft to stabilize in roll. Pitch corrections are similarly accomplished. The rotating dipole antenna 40 of FIG. 4 has the advantage of requiring more simple circuitry than does the apparatus of FIGS. 1 and 3 or a dipole antenna rotating in a plane parallel to the axes of the aircraft 42 as described above. Additionally, a signal of high amplitude is produced in all situations by a dipole rotating in a plane perpendicular either to the longitudinal or transverse axes of the aircraft 42.

Figure 5:
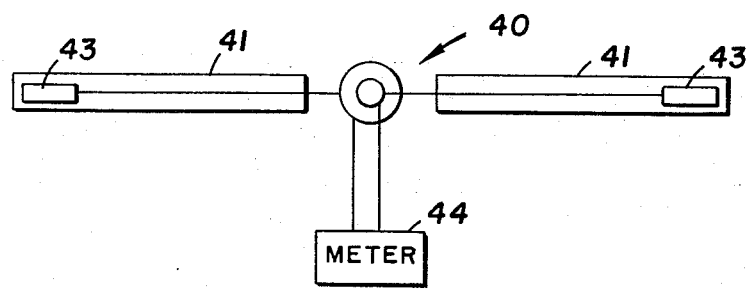

The dipole antenna 40 may be further described as being comprised of two separate "poles" 41, such as is shown in FIG. 5. The poles 41 are formed of conductive material and are insulated from physical contact with each other. The poles 41 are joined electrically through the voltmeter 44 or a current meter (not shown). Disposition of an ionizing probe 43 on each of the poles 42 produces a higher reading more useful for detecting the attitude of the aircraft 42 in order to stabilize said aircraft.

The invention may be practiced in fashions other than those specifically described herein without departing from the scope of the appended claims.

What is claimed is:

1. Apparatus for detecting the attitude relative to a reference plane of an airborne vehicle operating in the electrostatic field existing in the earth's atmosphere, comprising:
   probe means mounted on said vehicle and responsive to the magnitude of said electrostatic field;
   means for rotating the probe means in a given plane; and,
   means connected to said probe means for producing an output signal having an amplitude proportional to the angular attitude of the given plane, relative to the reference plane, in which the probe means are rotated and a phase related to the azimuthal direction of maximum tilt of the given plane, said output signal indicating the degree of alignment between said plane and the reference plane, the reference plane comprising an equipotential plane existing in the earth's electrostatic field.

2. The apparatus of claim 1 and further comprising stabilizing means on the vehicle responsive to said output signal for adjusting the attitude of said vehicle to align the plane in which the probes are rotated with an equipotential plane existing in the earth's electrostatic field.

3. The apparatus of claim 1 wherein said probe means comprise at least one electrostatic voltage sensing probe mounted on the vehicle.

4. The apparatus of claim 1 wherein said output signal producing means comprises a differential voltmeter.

5. The apparatus of claim 1 wherein said output signal producing means comprises a current meter.

6. The apparatus of claim 1 wherein the airborne vehicle is a helicopter and said means for rotating the probe means comprises the rotor blades of said helicopter, the probe means being disposed on at least one of the rotor blades.

7. The apparatus of claim 1 wherein the probe means are disposed on the vehicle for rotation in a plane perpendicular to the longitudinal axis of the vehicle.

8. The apparatus of claim 1 wherein the probe means are disposed on the vehicle for rotation in a plane parallel to the longitudinal axis of the vehicle.

9. The apparatus of claim 1 wherein the probe means comprises a dipole antenna.

10. The apparatus of claim 9 wherein the dipole antenna has electrostatic voltage sensing probes mounted on each pole thereof.

11. The apparatus of claim 9 and further comprising means for rotating said first-mentioned rotating means.

12. A method for stabilizing an airborne vehicle operating in the electrostatic field existing in the earth's atmosphere relative to a reference plane, comprising the steps of:
rotating at least one sensing probe responsive to the electrostatic field in a given plane;
generating an output signal having an amplitude proportional to the angular attitude of the given plane, relative to the reference plane, in which the probe is rotated and a phase related to the azimuthal direction of maximum tilt of the given plane; and,
angularly displacing the position of the plane in which the probe is rotating to align with the reference plane, said reference plane comprising an equipotential plane existing in the electrostatic field.

* * * * *

UNITED STATES PATENT OFFICE
CERTIFICATE OF CORRECTION

Patent No. 3,866,859             Dated February 18, 1975

Inventor(s) Maynard L. Hill

It is certified that error appears in the above-identified patent and that said Letters Patent are hereby corrected as shown below:

On the cover sheet insert:

[73] Assignee: The Johns Hopkins University, Baltimore, Md.

Signed and Sealed this twenty-ninth Day of July 1975

[SEAL]

Attest:

RUTH C. MASON
*Attesting Officer*

C. MARSHALL DANN
*Commissioner of Patents and Trademarks*